United States Patent [19]

Schwertfeger et al.

[11] 3,825,235

[45] July 23, 1974

[54] METHOD AND APPARATUS FOR PROCESSING PLASTICIZABLE MATERIAL

[76] Inventors: Walter Schwertfeger, Im Schein, 9244 Niederuzwill; Bruno Stillhard, Wildeggstrasse 38, 9000 St. Gall, both of Switzerland

[22] Filed: June 29, 1972

[21] Appl. No.: 267,451

Related U.S. Application Data

[62] Division of Ser. No. 42,987, June 3, 1970, abandoned.

[52] U.S. Cl. ............................................. 259/191
[51] Int. Cl. ............................................. A21c 1/06
[58] Field of Search ......... 259/191, 192, 193, 9, 10; 425/145

[56] References Cited
UNITED STATES PATENTS

3,002,615  10/1961  Lemelson ............................ 425/145
3,509,600  5/1970  Noble ................................. 425/145

*Primary Examiner*—Robert W. Jenkins
*Attorney, Agent, or Firm*—McGlew and Tuttle

[57] ABSTRACT

Apparatus for processing plasticizable material by extrusion from a die comprises a processing tool, such as a rotatable and reciprocable screw, which is supplied with power in accordance with a predetermined processing program. The desired and actual values of the movement of either the processing tool or the plasticized material processed by the tool are compared, as a function of time, along certain sections of the path of movement. The movement of the processing tool is regulated in accordance with differences between the compared desired and actual values. The apparatus is hydraulically operated under electrical, electromechanical or electrohydraulic controls. The desired values of the movement may be stored, for example, on an endless magnetic tape and supplied as pulses to comparing means which also receive pulses corresponding to the actual movement of the processing tool or the material plasticized by the tool. A forward and backward counter is included in the apparatus. In one embodiment of the apparatus, digital-analog converters are used.

16 Claims, 5 Drawing Figures

3,825,235

METHOD AND APPARATUS FOR PROCESSING PLASTICIZABLE MATERIAL

CROSS REFERENCE TO RELATED APPLICATION

This application is a division of application Ser. No. 42,987, filed June 3, 1970, and now abandoned.

BACKGROUND OF THE INVENTION

It is known to process plasticizable material by extrusion from a die using a processing tool, such as a rotatable and axially reciprocable screw. In one known arrangement, the tool and the plasticized mass, to be extruded through the die, are controlled to maintain a constant viscosity of the plasticized mass. In another known procedure, the rate of extrusion of the plasticizable material through the die, or the return regulation of the plasticizing tool during plasticizing, are controlled as a function of the displacement path or movement.

SUMMARY OF THE INVENTION

This invention relates to apparatus for processing plasticizable material by extrusion from a die, using a processing tool supplied with power in accordance with a predetermined processing program.

In particular, the apparatus of the invention permits the production of a semi-finished or finished product of plasticizable material, for example, plastic composition material, throughout very long continuous processing phases, or in successive individual phases interrupted by processing intermissions. In accordance with the invention, the desired and actual values of the movement of either the processing tool or the plasticized material processed by the tool are compared, as a function of time, along certain sections of the path of movement. The movement of the processing tool, and the power supply thereto, are then regulated in accordance with differences between the compared desired and actual values. By virtue of this particular procedure, there are taken into consideration, during processing, not only process-charactertistic parameters of the plasticizable and plasticized material but also those of the processing tool as well as the power supplied to the latter.

In accordance with a further feature of the invention, deviations of path sections, occurring outside the control movement, can be used for a follow-up control to bring correspondence between the desired value and the actual value.

The apparatus of the invention comprises a fixed apparatus part and a processing tool movable relative thereto by a controllable power drive, a scannable setting means reproducing the processing program, a measuring member for determining the functional difference between the tool or, respectively, the power drive, and the setting means, and an operative connection from the measuring member to the power drive or to the setting means. There are known or proposed machine tools which are equipped to permit the determination of the absolute position of two mutually movable tool parts. By suitable separation of certain parts of the device for the processing of plasticizable material, on the one hand, and of elements of the setting means and of the measuring means connected to the power drive by an operative connection, on the other hand, performance of the invention is, surprisingly, possible.

In accordance with the invention, the apparatus includes a time-functional actual-value transmitter associated with the tool or with the power drive, and actuable according to movements of the tool along the path sections. The actual value transmitter and the desired value transmitter are associated with a differential transformer as a measuring member. A correction signal, or a follow-up control signal, generated in the differential transformer by time-function differences is supplied selectively to the control of the power drive or to the setting means, through the operative connection, following the specified conditions.

With the invention apparatus it is possible, at any desired time during the movement, to operate the tool performing the processing, or to operate the power drive of the tool, according to certain predetermined processing conditions, and to exert a correcting effect when there are deviations between the predetermined condition and the actually occurring processing.

Several forms of elements reproducing the desired value conditions of the processing program, of the elements evaluating the difference between the desired value and the actual value to supply the difference to the power drive, and of a correcting device influencing the desired value, may be used in the apparatus. The invention is further directed to the processing of plasticizable material in a press comprising a rotatable and axially displaceable plasticizing and extrusion worm or screw for the processing of plastic hot or cold setting material.

An object of the invention is to provide improved apparatus for processing plasticizable material by extrusion from a die.

A further object of the invention is to provide such an apparatus using a processing tool which is supplied with power in accordance with a predetermined processing program, and comparing, as a function of time, the desired and actual values of the movement of either the processing tool or the plasticized material processed by the tool along certain sections of the path of movement.

Another object of the invention is to provide such an apparatus in which the movement of the processing tool is regulated in accordance with the difference between the compared desired and actual values.

For an understanding of the principles of the invention, reference is made to the following description of typical embodiments thereof as illustrated in the accompanying drawings.

DESCRIPTION OF THE PREFERRED EMBODIMENTS

Figure 1:
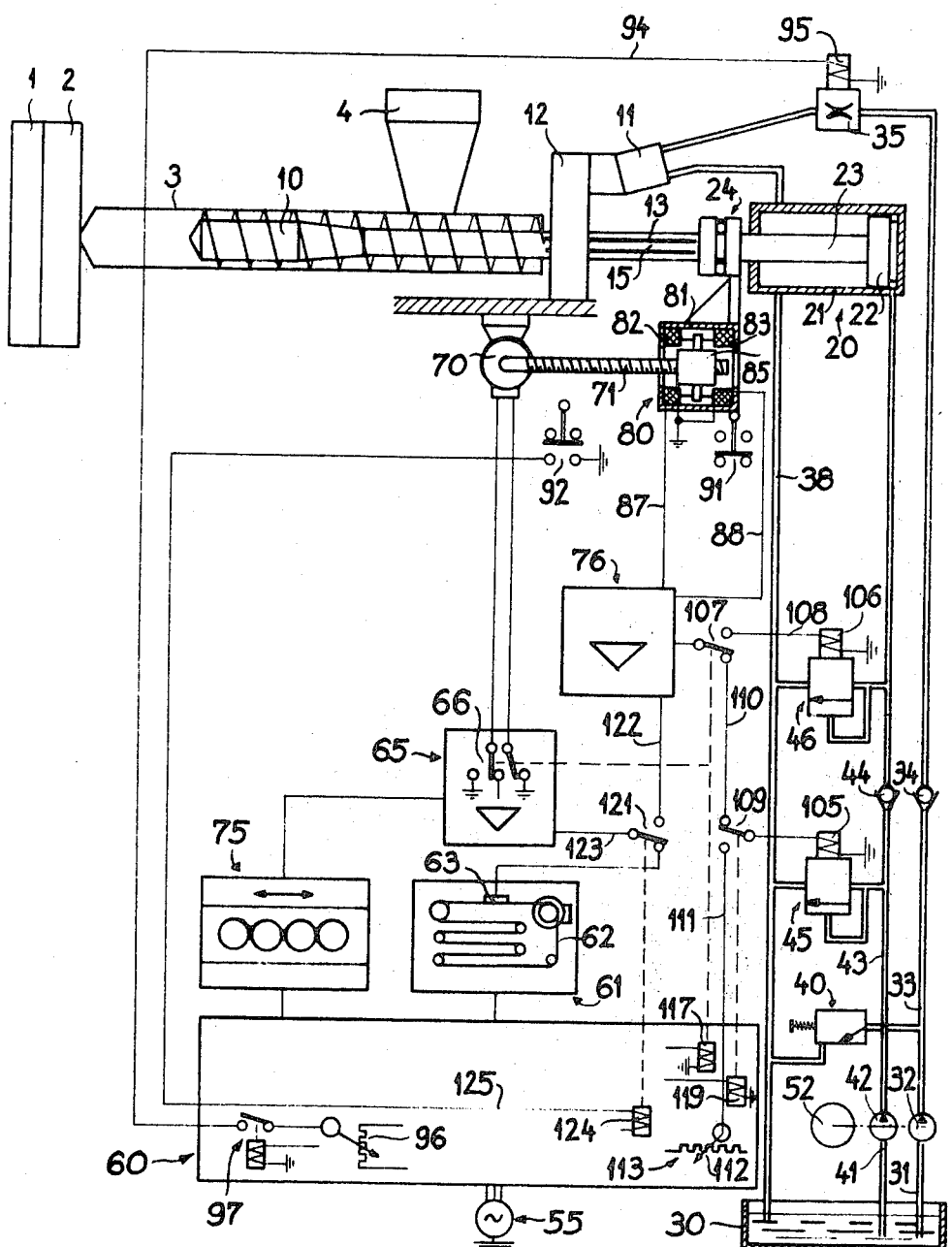
FIG. 1 is a part elevation, part sectional and part schematic illustration of one embodiment of apparatus in accordance with the invention.

Referring first to FIG. 1, an injection molding machine includes a movable mold half 1, a fixed mold half 2, a plasticizing cylinder 3 fed through a feed funnel 4 thereon, and a plasticizing and injecting worm or screw 10, serving as a tool, and which is rotatable in cylinder 3 and also axially displaceable therein. A hydraulically operated motor 11 has a transmission 12 connected therewith, and this transmission receives the drive shaft 15 of worm 10. Shaft 15 is splined, as by being formed with V-shaped grooves 13, and is axially displaceable through transmission 12 while being constantly mechanically connected to the transmission for rotation thereby. A power drive 20, for axially reciprocating worm or screw 10, includes an injection cylinder 21 displaceably receiving a piston 22 having a piston rod 23 connected, through a pressure or thrust bearing 24, with drive shaft 15 of worm or screw 10.

A first hydraulic system for rotating motor 11, and thus rotating worm or screw 10, comprises a tank or sump 30 storing the hydraulic medium and connected by a suction line 31 to the inlet of a pump 32. The pressurized output of pump 32 is supplied to a pressure line 33, having a check valve 34 therein, and from line 33 to a quantity regulator 35 connected to motor 11. A return or tank line 38 connects motor 11 to sump or reservoir 30. A pressure limiting valve 40 interconnects pressure line 33 and tank line 38.

A second hydraulic system includes a suction line 41 connected between reservoir 30 and a pump 42 driven by a motor 52 which also drives the pump 32. Pump 42 supplies hydraulic medium under pressure to a pressure line 43 provided with a check valve 44 and connected to cylinder 21 behind piston 22. A first electrohydraulic pressure regulating valve 45 interconnects lines 43 and 38 in advance of check valve 44, and a second electro-hydraulic pressure regulating valve 46 interconnects lines 43 and 38 downstream of check valve 44. The electric control system comprises, essentially, a source of electric potential 55, a machine control 60 connected to source 55, and control and regulating members, elements or components connected to machine control 60. These components include a scannable electromagnetic desired value storage device 61, in the form of a magnetic storage tape 62 and a scanning head 63, and an amplifier 65, which may be designed as a function transformer, with a condition switch 66. A stepping motor 70 is connected to switch 66 and drives a threaded spindle 71. An adding and substracting pulse counter 75, which may be calibrated in measurement units of the displacement path of worm 10, is connected between amplifier 65 and machine control 60.

The control and regulating components further include a measured value amplifier 76, which may also operate as a function transformer adapted to the characteristics of the electro-hydraulic pressure regulating valves 45 and 46. A differential transformer 80 has a first part 81 connected either with power drive 20 or tool 10, and comprises two electric coils or windings 82 and 83 embracing, in axially spaced relation from each other, spindle 71. The other part of transformer 80 is a permanent magnet core member 85 which is displaceable by rotation of spindle 71. Through the medium of respective lines or conductors 87 and 88 connected to first ends of coils or windings 82, 83 of differential transformer 80, these coils operate as two branches of a bridge circuit completed in amplifier 76, and the opposite end or terminals of coils 82, 83 are commonly connected to ground. Limit switches 91 and 92 are operatively associated with differential transformer 80.

An adjustable resistance 96 is connected in the supply conductor 94 leading to the exciting winding 95 of quantity regulating valve 35, and a relay operated switch 97, in machine control 60, is interposed between adjustable resistance 96 and the exciting winding 95. Respective operating electromagnets 105 and 106 are associated with the electohydraulic pressure regulating valves 45 and 46. A "Rotation-Shot" reversing switch 107 includes a movable arm connected to amplifier 76 and a first contact connected by conductor 108 to electromagnet 106. A "Shot/Rotation-Afterpressure" reversing switch 109 has a movable arm connected to electromagnet 105 and has one contact connected by conductor 110 to a contact of reversing switch 107. A supply line 111 extends from the contact of switch 109 to a tap 112 of an excitation regulator 113 in machine control 60.

Machine control 60 includes a relay winding 117, controlled as a function of the program of machine control 60, and operating reversing switch 107. The machine control further includes a relay winding 119, controlled as a function of the program of machine control 60, and operating reversing switch 109. A "Shot/Rotation-Afterpressure" reversing switch 121 has its movable contact connected by a conductor 123 to amplifier 65, and one of its fixed contacts is connected, by a conductor 122, to the measured value amplifier 76. Switch 121 is operated by a relay winding 124 in machine control 60, and a conductor 125 connects relay winding 124 to limit switch 92. Machine control 60 serves as the current and voltage supply for the control and regulating components.

Worm 10, serving as a powered processing tool in plasticizing cylinder 3 having a known die, which is not described in further detail, attachable on injection mold heads 1 and 2, serves both for plasticizing material supplied through feed funnel 4, by rotation of worm 10, as well as for extrusion through the die by axial displacement of worm 10. Rotation of tool 10 is effected by hydraulic motor 11 through transmission 12 connected therewith and through the shaft 15 of worm 10 having the splines or longitudinal V-shaped grooves 13.

Figure 3:
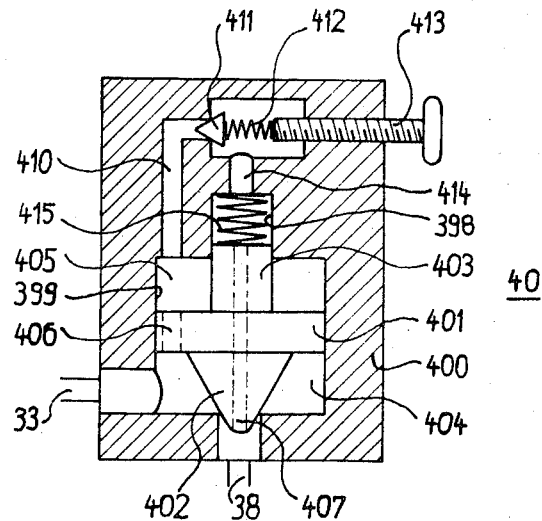
FIG. 3 is an axial sectional view through a pressure limiting valve used in the apparatus of the invention.

FIG. 3 illustrates pressure limiting valve 40, which comprises a housing 400 having a cylinder 399 formed therein in which there is a piston 401 including a valve body 402 and a guide piston 403, which latter extends into guide bore 398, the piston and its associated parts being axially displaceable in cylinder 399. Piston 401 divides cylinder space 399 into two chambers 404 and 405, which are in communication through a bore or passage 406 in piston 401. A control bore 410 extends from chamber 405 to a control valve 411, which is biased, by setting screw 413 acting through spring 412, against the opening of control bore 410 with an adjustable force depending on the setting of screw 413. A relief bore 414 extends into guide bore 398 in which there is a spring 415 acting on guide piston 403. An axial bore 407 extends through guide piston 403, piston 401 and valve body 402 to communicate with a port connected to tank or return line 38. Pressure line 33 communicates with cylinder chamber 404.

As long as valve 411 blocks control line 410, equal pressures prevail in cylinder chambers 404 and 405 so that valve body 402 blocks tank or return line 38. As soon as valve 411 opens, pressure medium flows from cylinder chamber 405 into tank or return line 38, the pressure in cylinder chamber 404 exceeds that in cylinder chamber 405, and piston 401, and thus valve body 402, moves away from the port communicating with tank line 38 so that pressure medium flows from cylinder chamber 404 into line 38. The pressure in pressure line 33 thus is limited.

Figure 4:
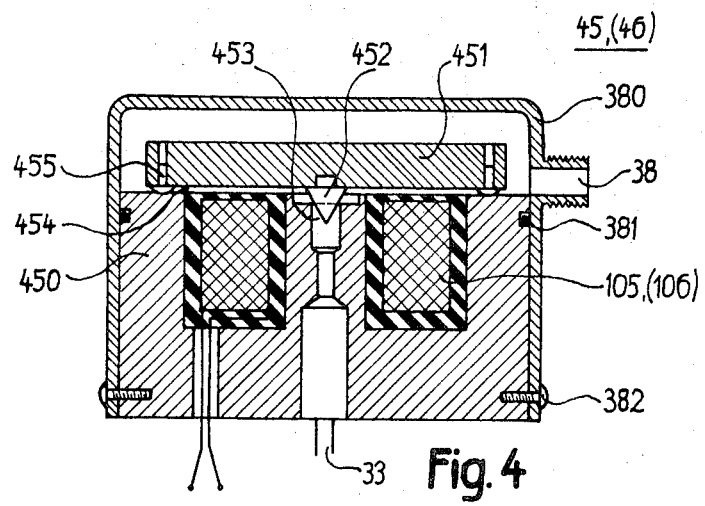
FIG. 4 is an axial sectional view through an electrohydraulic pressure regulating valve used in the apparatus.

The electro-hydraulic pressure regulating valve illustrated in FIG. 4 corresponds to the electro-hydraulic pressure regulating valves 45 and 46. A pot type magnet core 450, of high grade magnet iron, has embedded in it one of the excitation coils 105 or 106. Pressure line 33 communicates with a bore 453 which communicates with the zone of the central pole face of manget core 450, and the exit of bore 453 is closed by a valve body 452 on a magnet yoke 451. To insure a uniform air gap 454 over all the poles of core 450, non-magnetizable spacer bolts, for example, notched nails 455, are provided in armature 451. The armature and the magnet poles of core 450, in this zone, are covered by a hood 380 of non-magnetizable material, with an O-ring 381 being provided for sealing purposes. Hood 380 is secured to core 450 by screws 382, and has formed therein a connection for tank or return line 38.

Depending on the degree of excitation of the respective coil 105 or 106, which is dependent on the current flowing through the coil, a substantially directly proportional magnetic flux is built up from the outer core poles through armature 451 to the central core pole, and thus twice across air gap 454, so that armature 451 is pulled toward core 450 with a force which is substantially proportional to the exciting current. In the valve shown in FIG. 4, which operates completely frictionless, the hysteresis between the regulated hydraulic pressure and the exciter current is dependent only on the magnetic properties of the material of the core and yoke. Thus, the pressure adjusted in pressure medium line 33 is substantially directly proportional to the exciter current.

On the specific function sequence in the processing of plasticizable material, which may occur, in the usual manner, by a program of the general machine control 60, there is superposed, for a substantial improvement of the processing, an additional processing program in desired value storage device 61. This is illustrated as an electromagnetic tape storage 62, but may equally well be a storage device with a magnetizable foil and correlated reading heads. The desired value setting is designed so that the processing path occurs according to a time function. For such a program setting, there are two alternatives. Either the path-time function may be set in analog form, that is, as a curve, or in digital form, that is, in a step sequence.

In the example illustrated, the processing program is stored as a pulse sequence on endless tape 62 of the setting means. At uniform tape speed and desired differences of the displacement of plasticizing and injection worm 10 per unit of time, the pulse sequence must have different pulse intervals. Since, generally, the pulses read by the desired value storage 61 exhibit too low a voltage for direct control of the processing, they are subject to amplification before they are supplied to step motor 70, as is shown in the illustrated example.

As is known, step motors, such as motor 70, can be advanced by individual pulses by individual successive and defined angles of rotation, the direction of rotation being reversible in dependence on the polarity. A step motor is even able to follow relatively quick pulse successions with angular rotation steps, which ultimately leads to apparently continuous rotation. Now, as in the present example, if step motor 70 is used to drive spindle 71, there can be fixed, as a function of the single angular steps of step motor 70, the smallest possible linear displacement unit of a nut 85 threadedly engaged with spindle 71. In the present case, nut 85 comprises a part of differential transformer 80, and which serves to ascertain the difference of position between worm 10, serving as a tool to be displaced by power drive 20, such as piston 22 in cylinder 21, and the nut on spindle 71 as part 85 of the setting means.

As has also been known for some time, electromagnetic differential transformers essentially comprise two suitably interconnected chokes having variable air gaps, and for which, upon insertion in a bridge circuit, a linear relation between the displacement of the two differential transformer parts and the output, or starting, voltage is characteristic. This is true in particular also of the arrangement illustrated, the two magnet coils 82 and 83 of which, separately received in a component, are connected with tool 10 to be displaced in a control manner or, respectively, with power drive 20. The measuring signal produced by measuring member 80, here illustrated as a differential transformer, is used, possibly amplified, for the actual regulation of the movement of power drive 20 and hence of tool 10. For the analogously regulated supply of hydraulic medium to power drive 20, there are used electrohydraulic regulating valves 45 and 46 whose pressure regulation is proportional to the excitation of the associated electromagnets 105 and 106, respectively. Depending on the predetermined conditions of the processing program, several such electro-hydraulic pressure regulating valves may be used.

In the illustrated example, the electro-hydraulic pressure regulating valve 45, forming part of the pressure medium regulating means during the injection molding operation, serves for the extrusion of the plasticized mass through the die and to fix the afterpressure during the cooling time of the molding. The second electro-hydraulic pressure regulating valve 46 serves for the so-called dynamic pressure regulation during rotation of worm 10 for plasticizing the material. This dynamic pressure regulation serves to influence the plasticizing work, the return or retrograde movement of worm 10, upon gradual filling of the space between the di-and the tip of the worm with plasticized material, occurring more slowly or more rapidly in dependence on the value of the dynamic pressure. Depending on the operation of the respective electric switch 107 or 109, one or the other electromagnet 105 or 106 of the respective electro-hydraulic pressure regulating valves 45, 46 is connected, in measuring member 80, with amplifier 76 preferably serving as a function transformer.

Since there is very often desired, following the actual shot operation and during the cooling time of the injection molding contained in mold 1, 2, an afterpressure which prevents too much shrinkage, a corresponding possibility of connection is associated with the electrohydraulic pressure regulating valve 45. In machine control 60, a pressure-proportional current regulation is provided by the adjustable resistance 112–113. During this afterpressure, however, there still may occur slight displacements of tool 10, or power drive 20, and which cannot be programmed as to desired value. For this reason, to avoid difficulties in a later processing phase, the setting means whould be followed up to the actual value.

Reversing switch 121 is provided to make this possible, and switches measuring member 80, through amplifier 76 and any associated function transformer, to amplifier 65 and reversing switch 66. Thereby, intermittently upon attainment of a certain deviation at the measuring member 80, step motor 70 follows up. Thus, step motor 70 automatically is brought to the corresponding zero value for the next programmed processing, so that, on renewed scanning of tape storage 62, there occur no difficulties due to position.

By simultaneous counting, in counter 75, which can count forward as well as backward, the pulses arriving at step motor 70, the absolute or relative position of tool 10 is ascertainable numerically, depending on the stipulated requirements. A return from the counter into the machine control affords the advantage that, without the use of limit switches arranged along the displacement path and which must be correspondingly adjusted, path-dependent switching functions are nevertheless performable through machine control 60. It suffices to preselect, in the machine control, the specific path sections at which a switching function must occur. When there is coincidence between the desired value and the actual value, the desired switching operation takes place.

Figure 2:
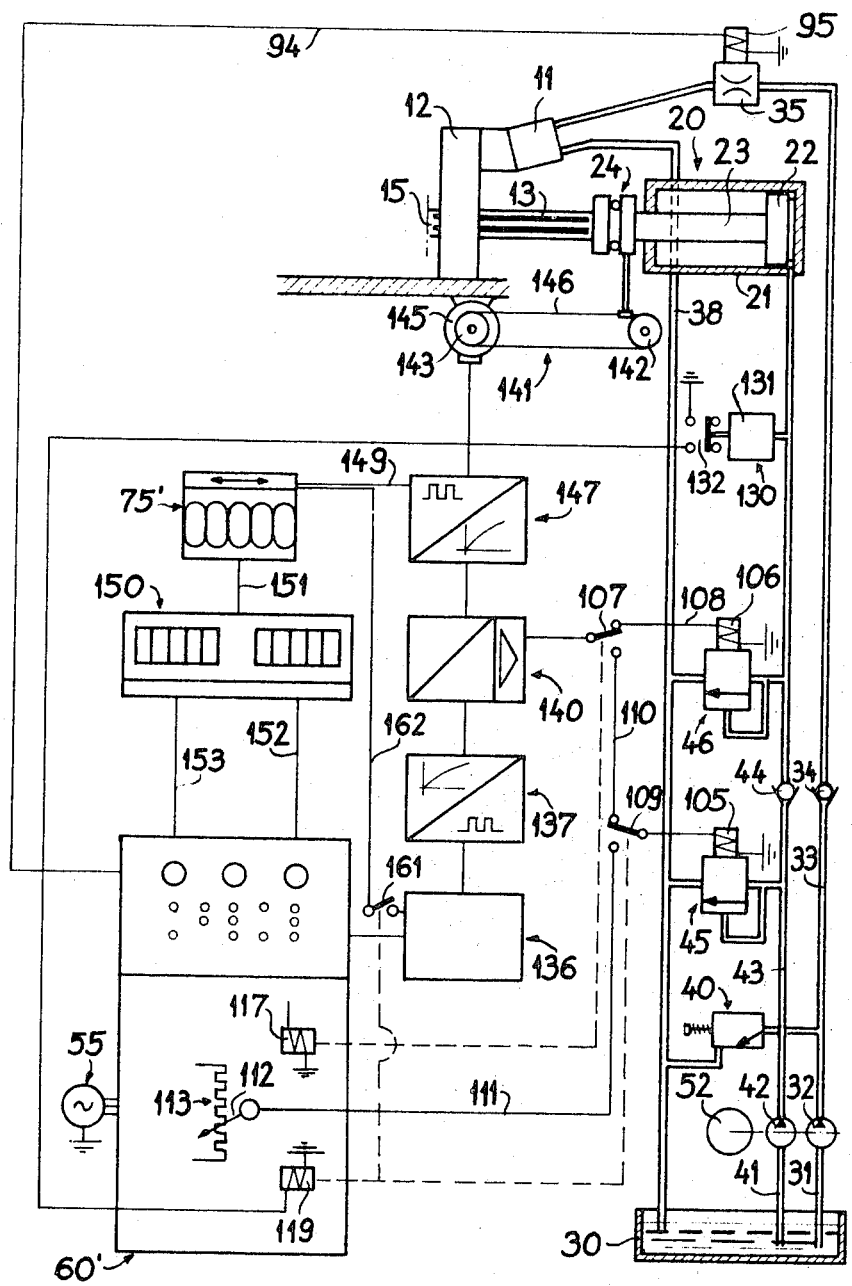
FIG. 2 is a view similar to FIG. 1 of another embodiment of apparatus in accordance with the invention.

The embodiment of the invention illustrated in FIG. 2 uses a hydraulic system which is similar to that used in the embodiment of FIG. 1. In the arrangement of FIG. 2, there is simply provided an additional pressure switch 130 comprising a pressure medium operated piston part 131 and an electromechanical reversing switch 132. The electro-hydraulic pressure regulating valves 45 and 46 are connected in the same manner as in FIG. 1.

Machine control 60', supplied from potential source 55, sets the programmed operation of the plastic processing machine and contains the control elements for the general operation of the machine for the processing of plasticizing material. There is connected, to machine control 60', the control circuit for the path-time functional course of the processing on the material side. This control circuit comprises a desired value storage device 136, programmable for the movement as a time function, with a pulse output. A digital-analog transformer 137 is connected to the output of storage device 136, and a desired actual value comparator and amplifier 140, which performs the function of a differential transformer, is connected to the analog portion of transformer 137. Tool 10, to be moved functionally by the power drive 20, has associated with it an actual value transmitter 141. Transmitter 141 comprises an endless tape 146 trained over a return roll 142 and a driving roll 143, tape 146 being fixedly connected either with power drive 20 or with tool 10 to be operated thereby.

An operative connection between desired-actual value comparator and amplifier 140 and pulse transmitter 145 is established through a digital-analog transformer 147. A reversing switch 107 is connected in a connection from comparator and amplifier 140 to the regulating electromagnet of one electro-hydraulic pressure regulating valve 46 and, in series with this first reversing switch 107, a second reversing switch 109 is interposed in a connection to the regulating electromagnet of the second electro-hydraulic pressure regulating valve 45. An excitation line 111 extends from second reversing switch 109 to machine control 60', wherein it is connected to the tap 112 of a pressure adjusting rehostat 113.

From the digital portion of digital-analog transformer 147, connected between pulse transmitter 145 and comparator and amplifier 140, a connecting line 149 leads to a forward and backward pulse counter 75', which may be calibrated in absolute values of the displacement of power drive 20 or of tool 10. Pulse counter 75' has connected thereto, by a conductor or line 151, a path-section preselector 150 connected by control lines 152 and 153 to machine control 60'. In conjunction with counter 75', preselector 150 permits the release or triggering of path-dependent control signals through machine control 60' to function members of the apparatus for processing of plasticizable material, for example, the injection molding machine.

The programmable desired value storage 136 may be, for example, a variable diode function generator of a known type, which will furnish a programmed pulse series. Such a function generator can be programmed, using modern computer techniques, by analog-digital transformation or by direct digital input, and permits the storage of a correspondingly supplied program. The pulses emitted by storage device or function generator 136, after the start triggered by machine control 60', are transformed in digital-analog transformer 137 into a path-time functional electric quantity, and are supplied as such, not intermittently but as a substantially steadily varying desired-value quantity, to comparator and amplifier 140.

Depending on the method of operation selected, one of the two pressure regulating valves 45, 46 determines the pressure medium supply to piston 22 of power drive 20 and, following supply of the pressure medium, piston 20, and thus tool 10, are displaced. This displacement, in turn, leads to a displacement of endless tape 146 around the return roll 142 and drive roll 143 of pulse transmitter 145, so that the latter furnishes a pulse series of larger or smaller pulse density, depending on the path displacement per unit of time. At a suitable ratio of linear displacement path to angle of rotation, and design of pulse transmitter 145 with respect to the number of pulses per revolution, each pulse can be expressed as an increment of the path length. In digital-analog transformer 147, the pulse series from pulse transmitter 145 is transformed into a time-functional actual path quantity, for example, as a voltage. The path-time functional actual value signal is transmitted over the operative connection to the desired-actual value comparator and amplifier 140 in the control circuit. In component 140 a difference signal is generated by deriving the difference between the desired value and actual value, is amplified, and is supplied to one or the other of electro-hydraulic pressure regulating valves 45, 46 or, respectively, the excitation electromagnets 105, 106 thereof, depending on the condition predetermined by machine control 60'. In the illustrated position of reversing switches 107 and 109, electro-hydraulic regulating valve 46 is excited, in accordance with the program, during rotation of screw or worm 10, causing a throttled flow of pressure medium from power drive 20 into tank 30. The pressure medium in power drive 20 then must have an elevated pressure determined by the setting of regulating valve 46. During this rotation of worm or screw 10, plasticized material is collected behind the extrusion die in plasticizing cylinder 3 and, with increasing collected volume, worm 10 is displaced to the right, counter to the dynamic pressure of power drive 20. In accordance with the occurring displacement to the right, pulse transmitter 148 is driven accordingly, so that it reproduces the travelled path time functionally as a pulse series.

This pulse series is supplied to digital-analog transformer 147 as the actual value, and then is supplied to forward and backward counting counter 75 which, is suitably calibrated, indicates the absolute position of worm or screw 10, or the relative position thereof in relation to a freely selected zero point. The pulse series can now be conducted from counter 75 through path selector 150 into machine control 65.

Thus it is possible, without electromechanical limit switches and by simple desired-actual value pulse comparison in preselector 150, to trigger certain switching functions in machine control 60'. Such a path-dependent preselection may consist in that, on reaching a certain return path of worm 10 or, respectively, of piston 22 in power drive 20, rotation is stopped and a preselecting actuation of the shot takes place. The shot itself is triggered only after fulfillment of certain machine-dependent functions, such as locking of the mold, insertion of core trains or sections, correct mold temperature, etc.

Also, the path-time functional course of the shot process is stored in the setting means, especially in that portion designed as function transmitter 136, and is supplied, upon release of the shot and through digital-analog transformer 137, to comparator and amplifier 140 to which is also supplied the pulse series from pulse transformer 145 as an actual signal and through the correlated digital-analog transformer 147. The derived difference signal is then applied, after amplification, for the shot, through the contact of reversing switch 109, switched over by relay coil 119, to the second electro-hydraulic regulating valve 45 thereby effecting a correspondingly controlled supply of pressure medium to power drive 20. This controlled supply of pressure medium effects a specific rate of displacement, so that power drive 20, and thus tool 10, pass through certain path sections at certain instants of time. A corresponding pulse series is produced by pulse transmitter 145. Deviations of the actual value from the desired value provide a control signal, as a voltage or a current, through exciter electromagnet 105 of regulating valve 45, effecting a correspondingly corrected, or a constant, pressure adjustment of regulator valve 45 and resulting in a corresponding control of the power drive. At the instant of final mold filling, the pressure in power drive 20 and in pressure line 43 connected thereto increases, causing the contact 132 of pressure switch 130 to close. As a result, solenoid 119 of switch 109 is excited, and switch 109 is reversed with exciter electromagnet 105 of electro-hydraulic pressure regulating valve 45 being connected to tap 112 of excitation regulator 113. Thereby, valve 45 is adjusted to the pressure value for the desired afterpressure, so that a corresponding force is exerted by the power drive 20 and tool 10.

Any still occurring displacements of power drive 20, and of tool 10, are supplied automatically, through pulse transmitter 145, to counter 75 as well as through digital-analog transformer 147 into desired-actual value comparator and amplifier 140. After completion of the afterpressure period, such possible variations of the positions, determined after the shot, of power drive 20 or tool 10 can be supplied as a zero point correction factor, from counter 75 to function generator 136. For this purpose, a relay switch 161 is operated by relay coil 119 simultaneously with operation of reversing switch 109, switch 161 being connected in follow-up line 162 extending from counter 75 to storage 136.

To avoid any difficulties in starting, it is readily possible, with the arrangement of the invention, to displace the first movement into a well defined end position, for example, the position "End Shot" and to take up from there, programmed by means of rotation, the operation of the plastic material processing machine. In contrast to the embodiment of the invention shown in FIG. 1, this has the advantage that the absolute position of the power drive or, alternatively, the tool, can always be known, that owing to this possibility of absolute positioned determination, path-dependent control functions are releasable at any time by purely electric preselection, and that, by purely electric means, any desired zero-point corrections or automatic zero-point adaptations, are possible.

Both embodiments of the invention provide, for plastic materials processing, and particularly for the processing of plastics, possibilities of programmed, fully automatic processing of plastic and plasticizable masses to semi-finished and finished products. Owing to the time-functional programming of displacement paths and the always insured actual-desired value comparison control, optimum material processing is provided.

It is within the scope of the invention to use a mechanical-hydraulic pressure regulating valve, similar to the electro-hydraulic pressure regulating valves, directly as a differential transformer. For this, the valve comprises a valve housing with inlet and outlet ports and a valve body for varying the flow ratios through the valve or, respectively the pressure gradient produced. Such a valve may be connected either directly in the hydraulic supply for the power drive or in the precontrol of a pressure regulating valve provided in such a power supply. The arrangement of such a valve is such that, for example, the valve housing is associated with the power drive or with the tool displaceable therewith in a fixed connection, and the valve body is displaced according to the programmed desired value, for example, by a step motor and associated spindle, along the path. Depending on the occurring desired-actual value differences of a path-time functional kind, between the value housing with the valve seat and the valve body cooperating with the valve seat, there occurs a correspondingly more intensive or weaker supply of the power drive.

Figure 5:
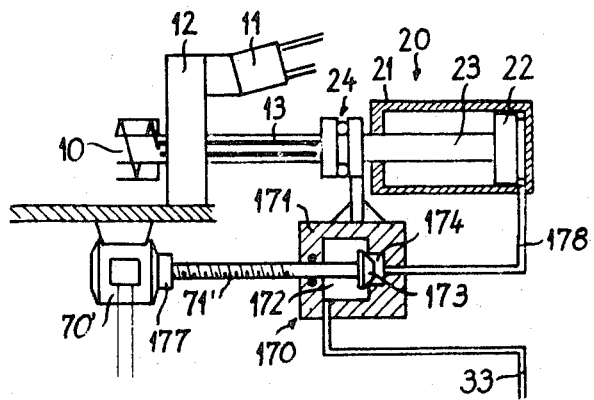
FIG. 5 is a part sectional and part elevation view of a mechanical-hydraulic pressure regulating valve usable in the apparatus.

It is also within the scope of the invention to use a mechanical-hydraulic pressure regulating valve, similar to the electro-hydraulic pressure regulating valve shown in FIG. 4, directly as a comparing device, such a valve being illustrated in FIG. 5. While the elements of power drive 20 and of rotation drive 11, 12 for worm 10 may remain the same, a comparing device 170 is inserted in pressure line 33 for power drive 20, and is followed by a connecting line 178 to power drive 20. Device 70 comprises a housing 171, which is connected with the power drive and having an inflow chamber 172 and an outflow chamber 174 formed therein. Between chambers 172 and 174 there is an adjustable flow regulating valve 173. This valve is formed or secured on a spindle 71' projecting, in pressure-proof relation, out of inflow chamber 172, and is axially displaceable, by motor 70', through a nut 177 threaded on spindle 71'. According to the operation of the embodiment of the invention shown in FIG. 1, motor 70' is excited by the setting means, thus presetting the desired displacement speed of spindle 71' through nut 171 and a hollow shaft in motor 70'. Depending on the magnitude of the opening between valve body 173 and outflow chamber 174, closed by valve 173, a different quantity of pressure medium is allowed to flow into cylinder 21 of power drive 20 for action on piston 22. Therefore, depending on the amount of lag of the movement of piston 22, and thus of worm 10, a correspondingly greater or lesser supply of pressure medium is regulated. Thus, in this arrangement, the measuring and comparing function is carried out in the same manner as in FIG. 1 in the same device but, in addition, this measuring and comparing device also performs the control function on the power drive. In substantial-agreement with this regulation, during the injection of plasticized material into the mold, there occurs a path-time functional desired-actual value regulation of the return movement of the worm during plasticizing.

While specific embodiments of the invention have been shown and described in detail to illustrate the application of the principles of the invention, it will be understood that the invention may be embodied otherwise without departing from such principles.

What is claimed is:

1. In apparatus for processing plasticizable material by extrusion from a die, of the type including an apparatus part, a processing tool cooperating with the apparatus part, a controllable power drive for effecting relative movement of the apparatus part and the processing tool or process material along a path of relative movement, and a machine control containing an adjustable processing program: control means comparing, as a function of time, the desired and actual values of such relative movement along a certain section of the path of movement and regulating such relative movement in accordance with differences between the compared desired natural values, said control means comprising, in combination, a setting means connected to said machine control and storing the desired relative movement; an actual value measuring member operable in accordance with such relative movement; a comparing member connected between said setting means and said actual value measuring member to detect deviation between the actual value of such relative movement and the desired relative movement during each program step; power source means; operative connections extending to said comparing member from said power drive and to said setting means; and means, including a feed back connection to said machine control selectively operable, responsive to deviation between the actual value of such relative movement and the desired relative movement during each program step, to establish one of said operative connections to said comparing member to restore coincidence between the actual value of such relative movement and the desired relative movement in advance of the succeeding program step.

2. Control means, as claimed in claim 1, in which said comparing member is a difference transformer including said measuring member as a first part and, as a second part, an element reproducing the stored relative movement in said setting means.

3. Control means, as claimed in claim 1, in which said tool is displaceable along a limited length of path by a piston displaceable in a cylinder by a hydraulic medium under pressure; an electromagnetically controllable valve regulating the hydraulic pressure applied to said piston; an actual value transmitter operatively associated with one of said tool and said power drive and transforming the time behavior of the movement along the individual path increments into a time-functional pulse sequence; said setting means providing a predetermined time-pulse sequence corresponding to a predetermined processing program, the two time-functional pulse sequences being compared in said comparing member; and means operatively connecting said comparing member to said electromagnetically controllable valve.

4. Control means, as claimed in claim 3, including a transformer converting rotary movement into linear movement and producing the time-functional pulse sequence of said actual value transmitter.

5. Control means, as claimed in claim 1, in which said setting means comprises a magnetizable foil storing the processing program, and an electromagnetic reading head operatively associated with said foil, said head and said foil being movable relative to each other.

6. Control means, as claimed in claim 5, in which the processing program stored on said foil is a time-functional pulse sequence predetermined for the increments of the path of such relative movement.

7. Control means, as claimed in claim 1, wherein said power drive is loadable, during a first processing phase along a large magnitude path of movement of said tool in accordance with preset path-time functions, and is loadable during a second processing phase of a very small magnitude path of said tool, as compared with the magnitude of said first mentioned path, in accordance with the preset pressure-time function; and a connectable operative connection supplying variations along said very small magnitude path, during the second processing phase, to said setting means as connection signals.

8. In apparatus for processing plasticizable material by extrusion from a die, of the type including an apparatus part, a processing tool cooperating with the apparatus part, a controllable power drive for effecting relative movement of the apparatus part and the processing tool or process material, and a machine control containing an adjustable processing program: control means comparing, as a function of time, the desired and actual values of such relative movement along certain sections of the path of movement and regulating such relative movement in accordance with differences between the compared desired natural values, said control means comprising, in combination, a setting means storing such relative movement; an actual value measuring member operable in accordance with such relative movement; a comparing member connected between said setting means and said actual measuring member; power source means; and operative connections from said power source means to said power drive and said setting means and selectively operable for connection of one of said operative connections to said comparing member; said power drive comprising a piston displaceable in a cylinder and a controllable and regulatable pressure medium supply system connected to said cylinder and including at least one valve having mutually adjustable parts for the regulation of the volumetric throughput of hydraulic pressure medium to said cylinder; said valve constituting a comparing member including one part displaceable with one of said tool and power drive and a second part displaceable with said setting means.

9. In apparatus for processing plasticizable material by extrusion from a die, of the type including an apparatus part, a processing tool cooperating with the apparatus part, a controllable power drive for effecting relative movement of the apparatus part and the processing tool or process material, and a machine control containing an adjustable processing program: control means comparing, as a function of time, the desired and actual values of such relative movement along certain sections of the path of movement and regulating such relative movement in accordance with differences between the compared desired natural values, said control means comprising, in combination, a setting means storing such relative movement; an actual value measuring member operable in accordance with such relative movement; a comparing member connected between said setting means and said actual value measuring member; power source means; operative connections from said power source means to said power drive and said setting means and selectively operable for connection of one of said operative connections to said comparing member; said comparing member being a difference transformer including said measuring member as a first part and, as a second part, an element reproducing the stored relative movement in said setting means; said processing tool being linearly reciprocable along a limited length of path by said power drive; said measuring member being movable with one of said tool and said power drive; and a displacement device arranged along said length of path as part of said setting means; said reproducing element being movable with said displacement device; said first and second transformer parts being relatively movable in accordance with such correlation; said measuring member and said reproducing element being displaceable relatively to each other.

10. Control means, as claimed in claim 9, in which said setting means comprises a spindle and a motor rotating said spindle in accordance with the desired value conditions of the processing program; said spindle extending parallel to said length of path and having a length corresponding thereto; said reproducing element being connected to said spindle for displacement thereby.

11. Control means, as claimed in claim 10, including a desired value storage with a variable time characteristic; said desired value storage controlling operation of said motor.

12. Control means, as claimed in claim 10, in which said motor is a stepping motor, said setting means comprising a variable pulse frequency and being operatively connected to said motor.

13. Control means, as claimed in claim 12, including a program setter having a selectively timed characteristic for individual sections of said length of path; said program setter varying the pulse frequency of said setting means.

14. Control means, as claimed in claim 13, including a function transformer connected between said setting means and said program setter.

15. Control means, as claimed in claim 10, in which said setting means has a variable amplitude characteristic; said motor being a DC motor connected to said setting means.

16. Control means, as claimed in claim 9, in which said power drive comprises a piston displaceable in a cylinder and a controllable and regulatable pressure medium supply system connected to said cylinder and including at least one valve having mutually displaceable parts for the regulation of the volumetric throughput of hydraulic pressure medium to said cylinder; an electro-inductive difference transformer constituting an actual value transmitter and including first and second parts, said first part being movable with one of said tool and said power drive and said second part being movable with said setting means; said valve being an electromagnetically operated valve; and circuit means connecting said electromagnetically operated valve to said difference transformer for operation of said electromagnetic valve in accordance with relative displacement of said first and second parts.

* * * * *